(12) United States Patent
Stottmann

(10) Patent No.: US 6,470,930 B1
(45) Date of Patent: Oct. 29, 2002

(54) TOOL HOLDER AND DUST PORT COMBINATION

(76) Inventor: Richard L. Stottmann, 5204 Avish La., Harrods Creek, KY (US) 40027

( * ) Notice: Subject to any disclaimer, the term of this patent is extended or adjusted under 35 U.S.C. 154(b) by 0 days.

(21) Appl. No.: 09/970,818

(22) Filed: Oct. 4, 2001

(51) Int. Cl.[7] ............................................... B27G 21/00
(52) U.S. Cl. ........................ 144/252.1; 15/328; 15/352; 144/251.2; 409/137; 83/100
(58) Field of Search ................. 83/100; 15/35, 15/320, 328, 352, 409, 426; 144/251.1, 251.2, 252.1, 252.2, 135.2; 408/56, 60, 61, 67, 97; 409/135, 136, 137

(56) References Cited

U.S. PATENT DOCUMENTS

| | | |
|---|---|---|
| 2,940,809 A | 6/1960 | Herzog |
| 3,905,273 A | 9/1975 | Shook |
| 4,409,699 A | 10/1983 | Moorhouse |
| 4,738,571 A | 4/1988 | Olson et al. |
| 5,098,235 A | 3/1992 | Svetlik et al. |
| D348,195 S | 6/1994 | Higgins et al. |
| 5,396,937 A | 3/1995 | Clausen |
| 5,943,732 A * | 8/1999 | Bosyj et al. ................... 15/328 |
| 6,019,148 A | 2/2000 | Hansen |

* cited by examiner

*Primary Examiner*—W. Donald Bray
(74) *Attorney, Agent, or Firm*—Stites & Harbison, PLLC; David W. Nagle, Jr.

(57) ABSTRACT

A storage and dust port device combines a body having a hollow interior and a vacuum port for vacuuming up dust particles and chips with a device for storing tool bits. The dust collection portion and the storage portion may be part of the same body or may be connected together by various means. A lid may also be provided to protect the stored tools from dust. The storage and dust port device may include a means to secure it to the work table so that the device may be used as a guide or fulcrum so as to minimize the kickback of the work piece as a result of the machining operation.

23 Claims, 11 Drawing Sheets

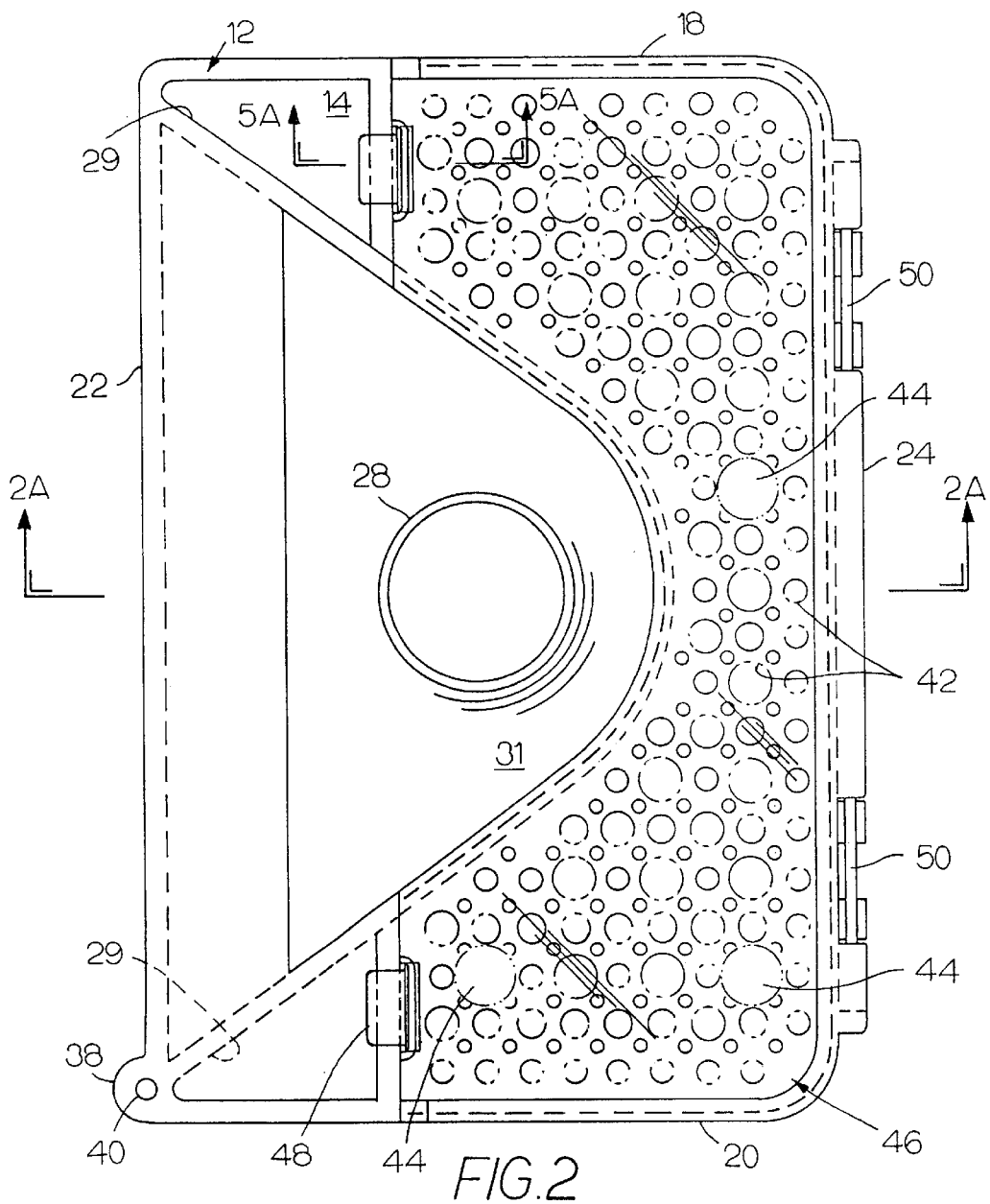
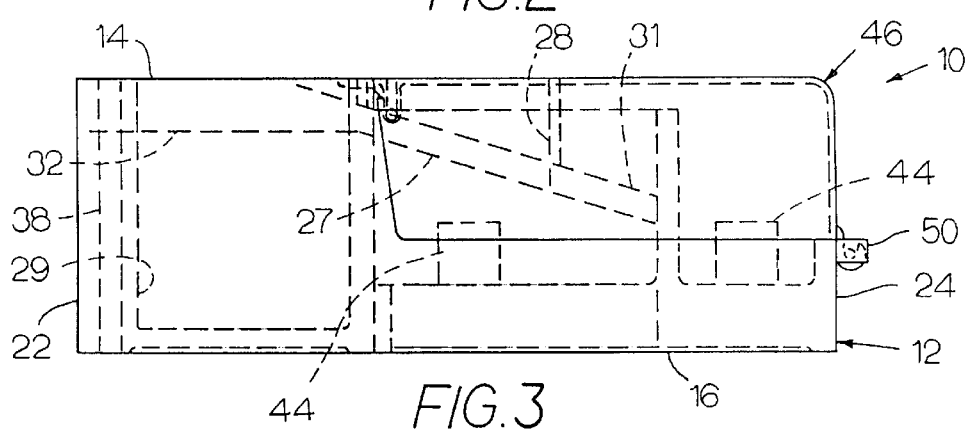

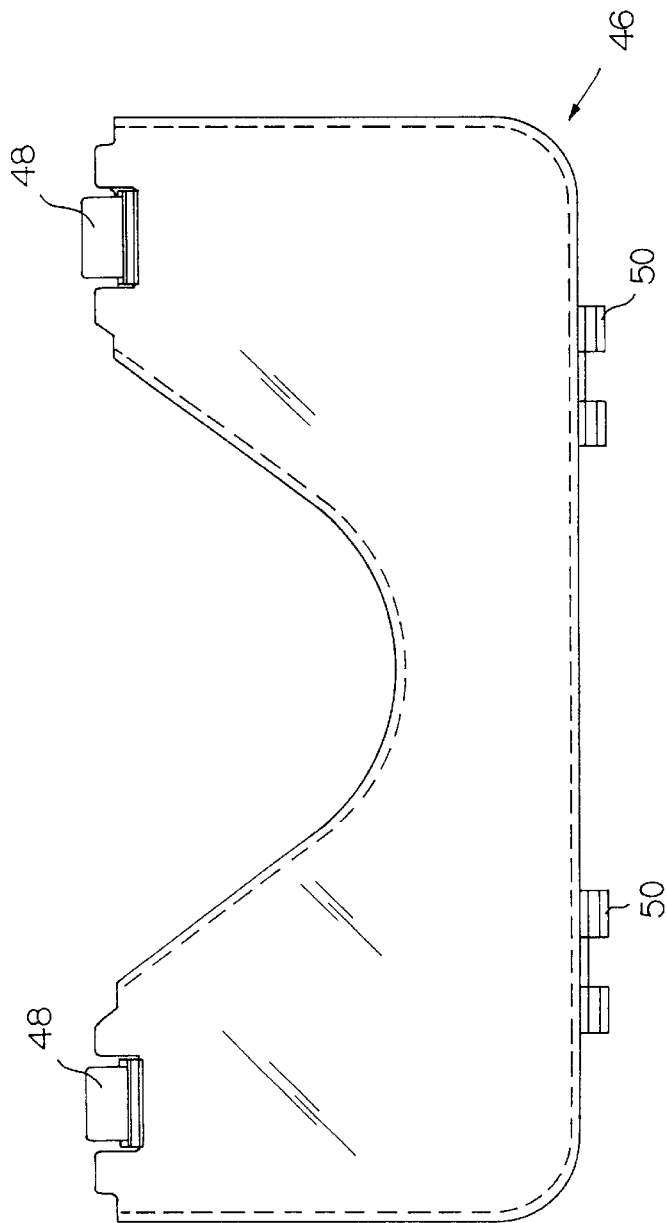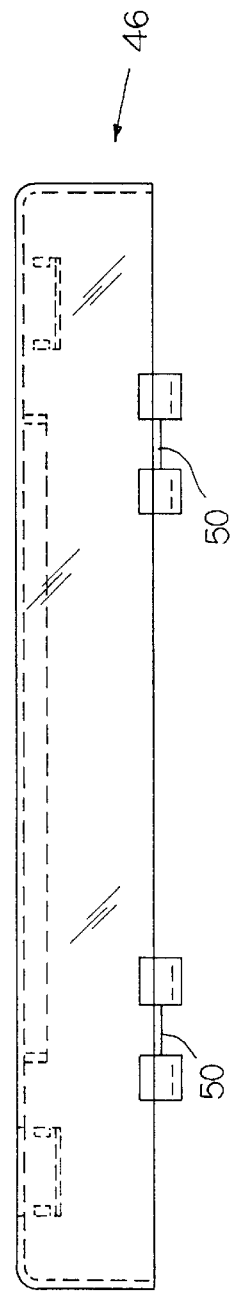
FIG. 8
FIG. 9

TOOL HOLDER AND DUST PORT COMBINATION

BACKGROUND OF THE INVENTION

The present invention relates to a tool holder and dust port combination. The tool holder primarily holds tool bits, such as router bits or drill bits, but it may also hold rulers, files, wrenches, pencils, and so forth. The dust port connects to a vacuum system to collect the dust and chips generated as the tool cuts into the work piece.

An increasing concern for air quality and for safety in the workshop have made it advantageous to adopt practices aimed at improving dust and chip collection around the work piece. There is also a need for the proper care and protection of the tool bits so that they are less likely to be misplaced, to be damaged, or to get in the way. Tool bits which are properly stored in a drawer in a separate table away from the tool itself will certainly be well protected, but they are less accessible to the user, requiring more time to go search for the right tool bit, and thus reducing overall worker efficiency.

SUMMARY OF THE INVENTION

The present invention provides a combination of tool bit storage and dust port in a single device. The combination of functions into a single device creates a new device which is much more helpful in the workshop. Bits and other tools are stored right on the work table instead of in a drawer or on another table. This saves considerable time in searching for tools during projects, as well as protecting the valuable tools themselves. Yet another benefit is that the work surface of the work table is less cluttered, and the air quality is improved by eliminating the dust and chips at the source, making for a safer work environment.

A preferred embodiment of a device made in accordance with the present invention includes a hollow base which is designed to sit on the work table. The base is open on one end to allow dust and particles to be drawn into the base by the vacuum exerted by a vacuum line attached to the top of the base via a vacuum line port connection. Also on the base is a storage area with a plurality of recesses for the placing of tools such as bits, so they may be properly stored and protected. In one embodiment, the storage area is covered by a transparent lid so the user may see what tools there are in the storage area while keeping dust away from the tools, and further protecting the tools. Pockets on the top of the base, as well as around the vacuum line port connection, provide additional storage areas for other tools, such as keys, allen wrenches, bearings, and screws.

DESCRIPTION OF THE DRAWINGS

FIG. 2 is a plan view of the storage/dust port device of FIG. 1;

FIG. 3 is a side view of the storage/dust port device of FIG. 2;

FIG. 5A is a detailed sectional view taken along line 5A—5A of FIG. 2, depicting one of the latches in the closed position;

FIG. 8 is a plan view of the storage area lid of the storage/dust port device of FIG. 2;

FIG. 9 is a rear view of the storage area lid of FIG. 8;

DESCRIPTION OF THE PREFERRED EMBODIMENT

Figure 1:
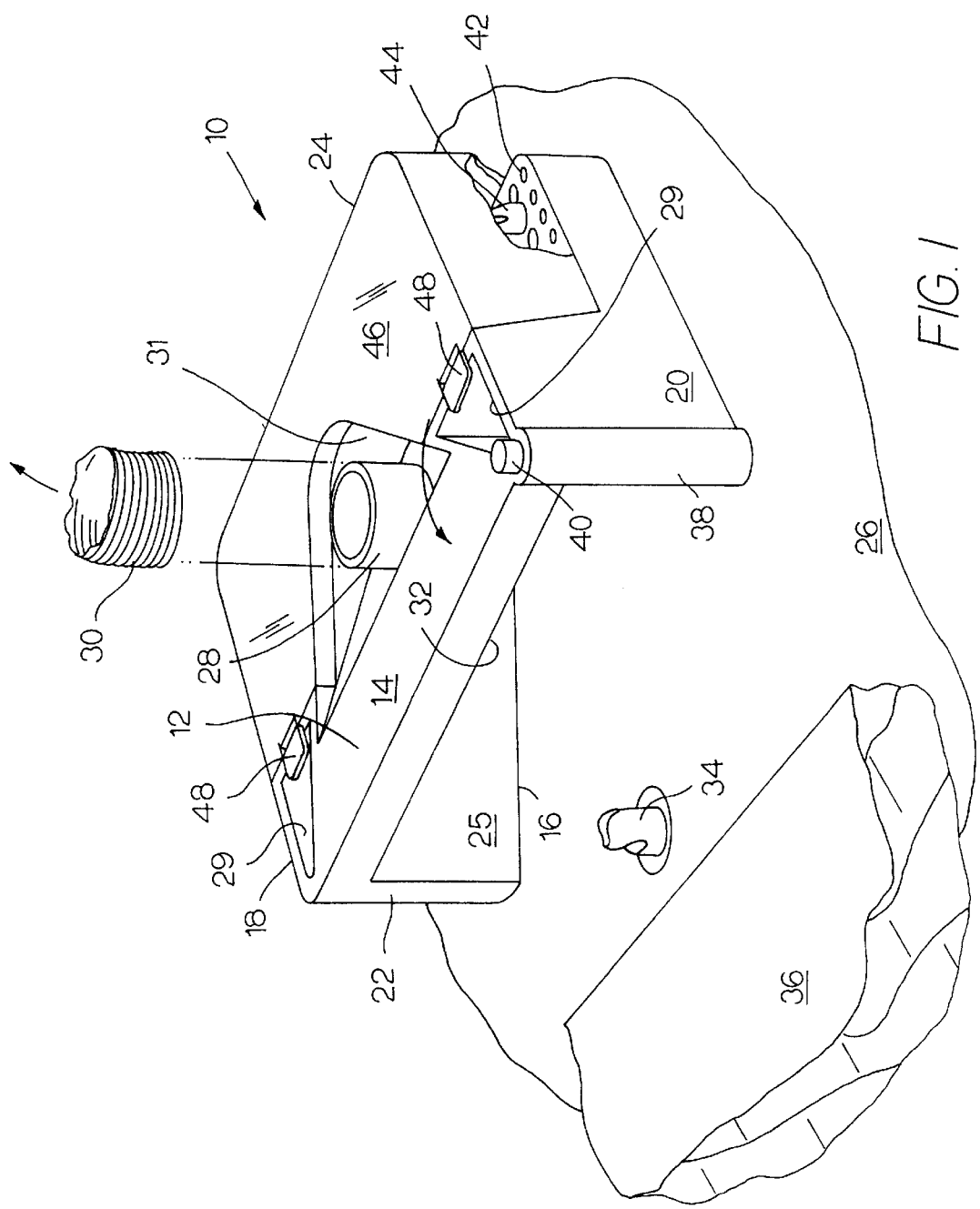
FIG. 1 is a partially broken away, perspective view of a storage/dust port device made in accordance with the present invention, positioned on a router table and showing the router bit and a broken away portion of the work piece.

FIG. 1 shows a preferred embodiment of a storage/dust port device 10 made in accordance with the present invention. In this embodiment, a substantially rectangular body 12, having top and bottom sides 14, 16, left and right sides 18, 20, and front and rear sides 22, 24 respectively, is designed to lay flat on a work table 26, such as a router table. The bottom side 16 in the embodiment simply provides a flat edge for resting the body on the substantially flat table 26. The body 12 is hollow and defines a large cavity 32, and this cavity 32 has an open front so as to provide an entrance for dust and chips to enter the cavity 32 of the hollow body 12. The cavity 32 also has interior side walls 25 and interior top wall 27, as best shown in FIG. 3.

Figure 2A:
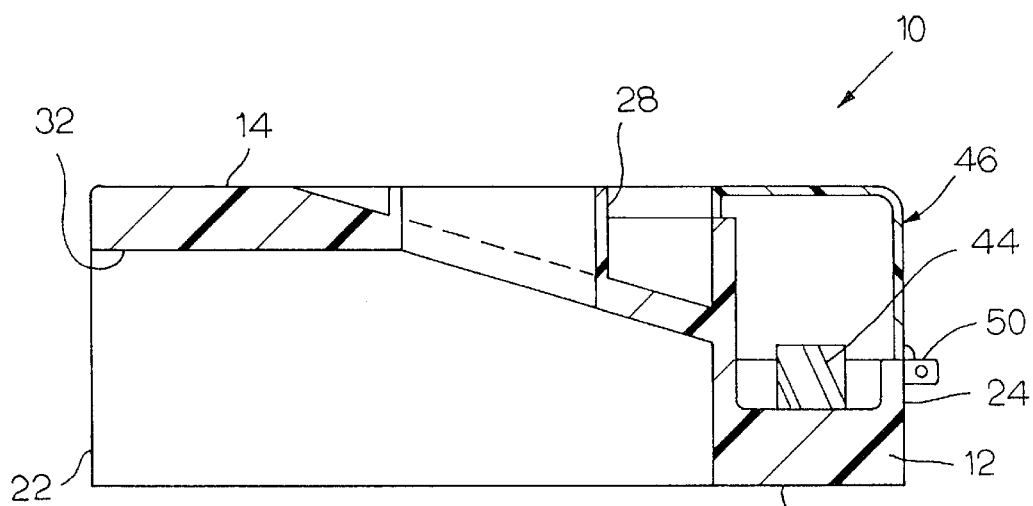
FIG. 2A is a sectional view taken along line 2A—2A of FIG. 2.
Figure 4:
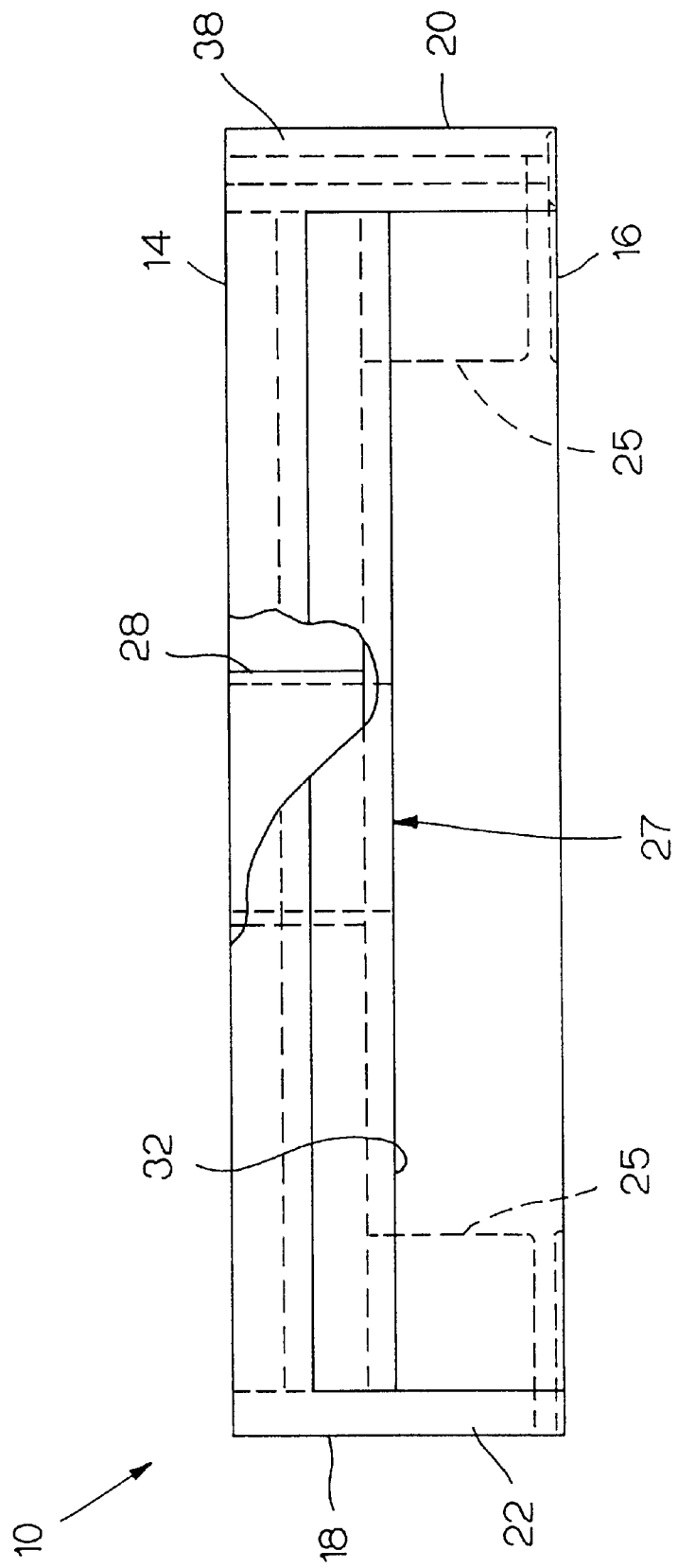
FIG. 4 is a front view, partially cut away, of the storage/dust port device of FIG. 2.

Toward the center of the top side 14 of the body 12, a short cylindrical port 28 projects upwardly. The port 28 provides a connection point for connecting a vacuum line 30, in order to put the vacuum line 30 in fluid communication with the cavity 32. The vacuum line 30 preferably fits snugly over the port 28 and may be secured to the port 28 by means of a fastener such as a clamp or connector (not shown). The interior side walls 25 and interior top wall 27, which define the cavity 32, taper from a large area opening at the front to a smaller area near the vacuum port 28 (as shown in FIGS. 1, 2A, and 3), such that the cross-sectional area (the width multiplied by the height) of the inside cavity 32 is continuously reduced from a maximum area at the front side 22, to a minimum area in the vicinity of the port 28. Thus, the opening is largest near the front side 22 of the substantially rectangular body 12, where it is open to receive as much as possible of the dust and chips generated by the tool bit 34 machining the work piece 36. The rear of the chamber 32 preferably is closed. As the cross-sectional area of the chamber becomes progressively smaller, the velocity of the air rushing into the vacuum line increases, making it easier for the inrushing air to pick up and carry the dust particles and chips being drawn into the inside of the cavity 32.

The preferred body 12 further includes a rounded front post or starter pin 38, which serves as a fulcrum to assist cutting operations. With the body 12 secured to the work table 26, the user may touch the work piece 36 to the front post 38 and then pivot the work piece 36 into engagement with the tool bit 34. The front post or fulcrum 38 reduces kick back of the work piece 36 from the tool bit 34. The body 12 may be secured to the work table 26 in a variety of ways, for example, with a pin or screw 40 that extends vertically through the post 38 into the table 26. Alternatively, a projection (not shown) could extend from the bottom of the body 12, into an opening in the work table 26, a projection could extend from the work table 26 into the body 12, or any of a variety of connection mechanisms could be used. The body 12 could also be attached to the work table 26 by drilling holes in both the body 12 and the work table 26 and inserting fasteners, such as screws (not shown). Alternatively, the holes could already be provided in the body 12. The preferred body 12 further includes two pockets 29, which are open at the top surface 14 of the body 12, and which may be used for storing odd shaped and longer tools, such as pencils, rulers, center punches, screws, etc. The size of these pockets 29 could be changed depending on the size of the tools to be stored. A depression 31 (caused by the inwardly tapering interior top wall 27 of the cavity 32) around the area where the port 28 projects beyond the top surface 14 of the body 12 is yet another area for storing of loose items such as screws, bolts, nuts, and coins.

Figure 16:
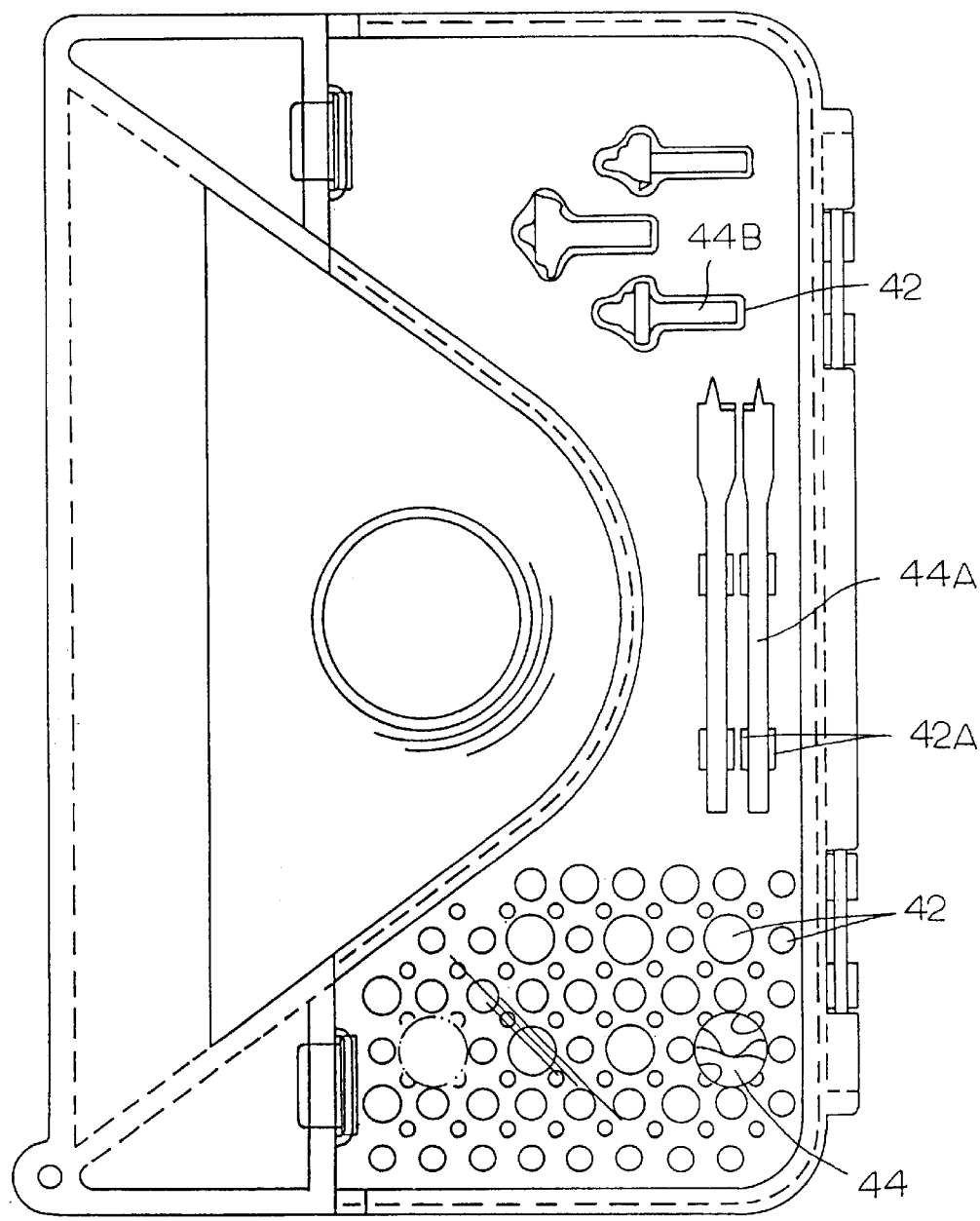
FIG. 16 is a top view of an embodiment identical to FIG. 2 except that there are various types of recesses for storing tools.

Referring now to FIGS. 2 and 3, recesses 42 are located along the top surface 14 of the body 12. The shanks of tool bits, such as router bits 44 or drill bits, may be placed in the recesses 42 in order to hold the tools bits 44 securely and separately from one another so as to protect their cutting edges. The recesses 42 may be holes which go all the way through the body 12, but it is preferred to have a bottom to the recesses 42 to prevent the tool bit shanks from penetrating all the way through the body 12. The recesses 42 in this embodiment are made with various diameters, corresponding to standard shank sizes for tool bits. As a further refinement, a piece of foam or rubber matting (not shown) with a matching set of holes may be laid over the recesses 42 to provide noise reduction and vibration isolation for the tool bits. As yet a further refinement, FIG. 16 shows an embodiment identical to that of FIG. 2, except that there is a variety of types of recesses for receiving the tools. Round recesses 42 of various sized receive the shanks of tool bits 44 in a vertical or angled direction. Snap-in recesses 42A receive tool shanks 44A in a more horizontal direction. Recesses 42B are shaped like the profile of the tools 44B and receive the tools 44B lying down.

In any event, the body 12 itself is preferably made from a plastic such as polypropylene with a chemical blowing agent, but other materials, such as other plastics, metal, or even wood, may be used without departing from the spirit and scope of the present invention.

Referring to FIGS. 2, 5, 8, and 9, a lid 46 is hinged at the rear end 24 of the body 12. Two catches or latches 48 snap the lid 46 shut against the body 12 (as shown in FIG. 5A) to provide added protection both to the tool bits 44 and to the user, and to keep dust particles and chips out of the tool bit storage area. The lid 46 is preferably manufactured from a clear material, such as a polycarbonate, to allow the user the ability to see into the storage area to look for a needed tool bit without having to open the lid 46. However, as in the case of the body 12, other materials may be used, and the lid 46 need not necessarily be clear. Furthermore, even though this embodiment 10 depicts a hinged lid 46, the lid 46 need only allow access to the tool bits 44 in the storage area, so it may be attached to the body 12 by any number of means such as snaps, clips, latches, hinges 50 or Velcro, or it may simply rest atop the body 12 or it may slide to open and close. It is also possible to omit the lid 46 entirely, providing an open storage area, without departing from the spirit and scope of the present invention.

To use the storage/dust port device 10, the operator places the storage/dust port device 10 on the top surface of the work table 26 near the cutting tool 34. If the operator intends to use the storage/dust port device 10 as a guide or fulcrum to minimize kickback to the work piece 36 from the cutting tool 34, then the storage/dust port device 10 may be secured to the work table 26 via the screw 40 or by other means, as has already been described. One end of a vacuum line 30 is attached to the vacuum port connection 28, and the other end of the vacuum line 30 is attached to a vacuum source such as a standard shop vacuum (not shown). The storage/dust port device 10 is now ready to be used to pick up any dust particles or chips generated from the cutting action of the tool bit 34 on the work piece 36.

Figure 5:
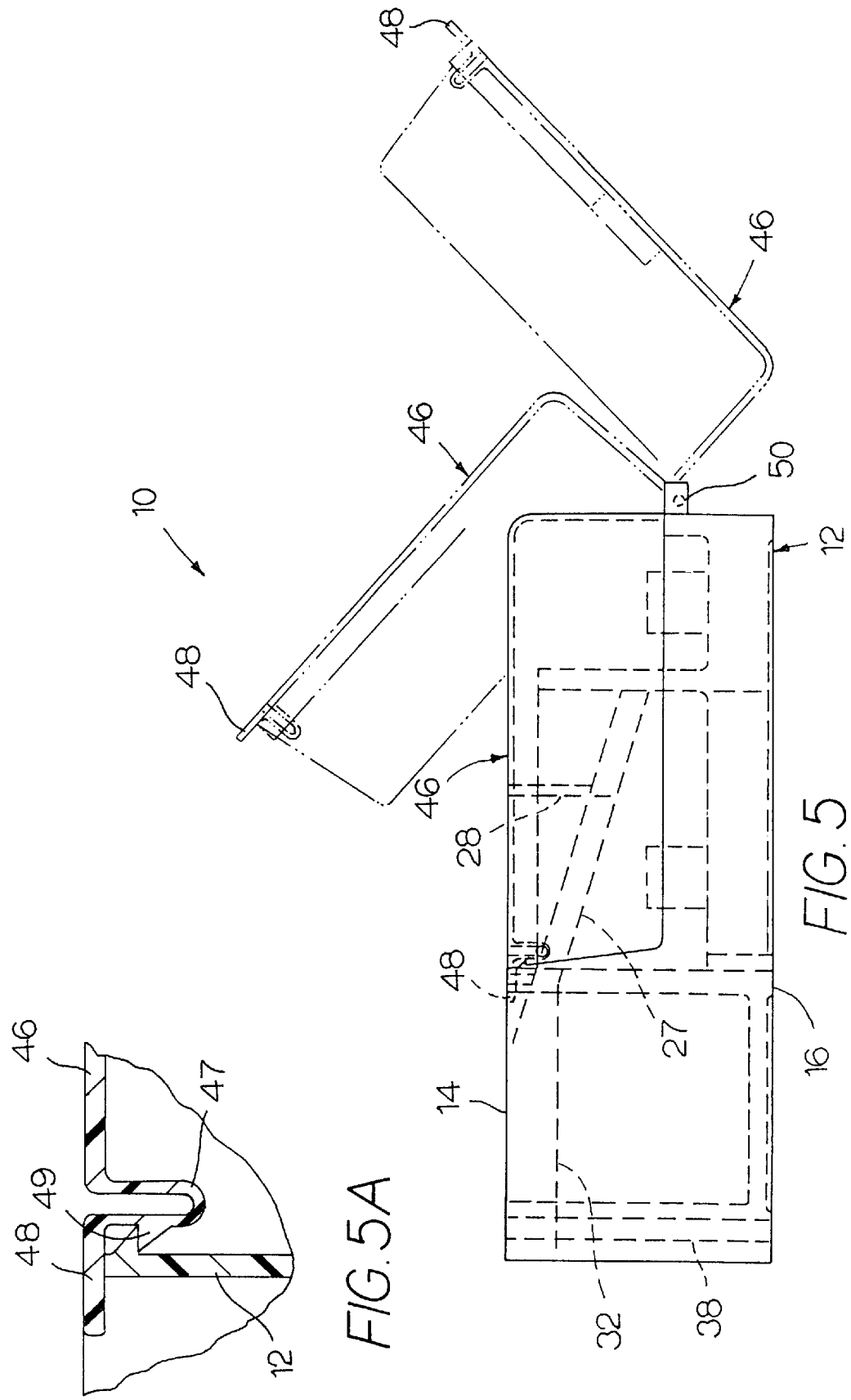
FIG. 5 is the same view as in FIG. 3 but with the lid shown in phantom in three different positions as it is opened.

To use the storage feature of the storage/dust port device 10, the user presses rearwardly and lifts upwardly on the latches 48 at the front of the lid 46, until the latch flexes enough in the area 47 for the portion 49 of the latch to come free from the body 12. Then, the user lifts the lid 46 to pivot it upwardly and rearwardly (as shown in FIG. 5), thereby allowing the user to pivot the lid open, providing access to the storage area. The tool bits 44 being stored are inserted in the recesses 42 in order to keep the tool bits 44 individually separated from each other so as to protect their cutting edges. The lid 46 is then closed. The front of the latch portion 49 is tapered, so that the contact of the front of the latch portion 49 with the base 12 causes the latch to flex rearwardly until it can snap shut. The storage area then safeguards the tool bits 44 from dust, from becoming damaged or lost, and from accidentally hurting someone. If the lid is made from a clear material, such as a polycarbonate, the user can readily check which tool bits 44 are available without having to open up the storage area.

ALTERNATIVE EMBODIMENTS

Figure 10:
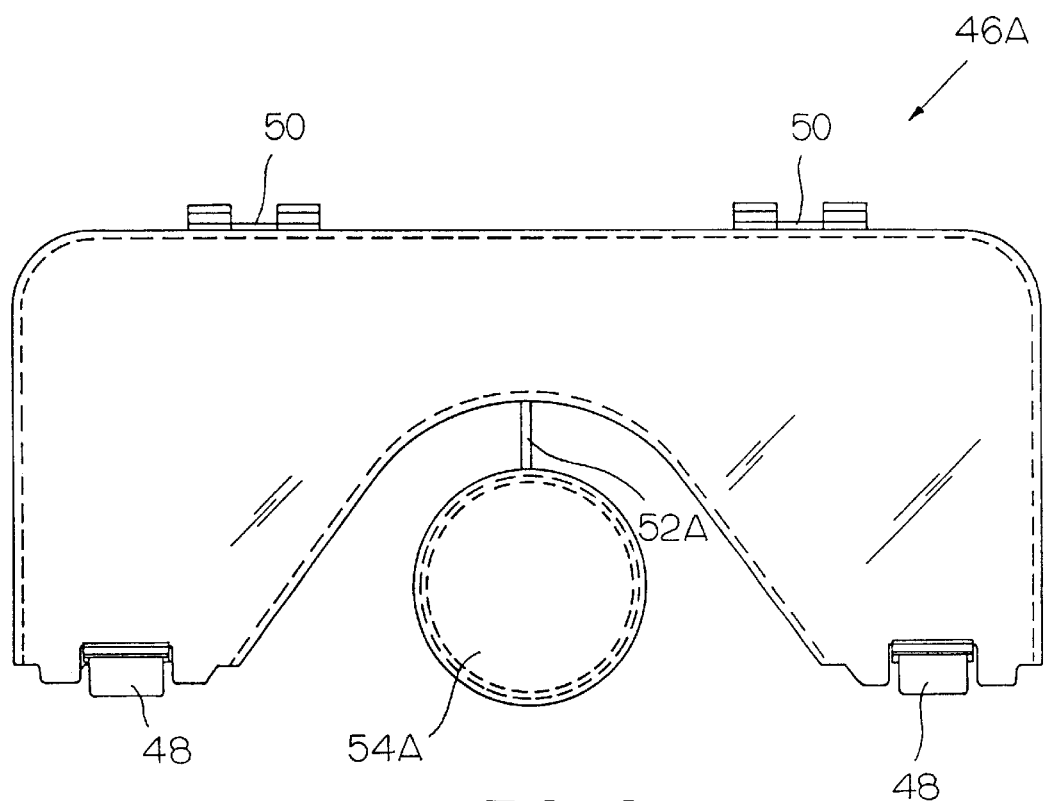
FIG. 10 is a plan view of a second embodiment of a storage area lid, similar to the lid of FIG. 8, except it includes a cover for the vacuum port connection.
Figure 11:
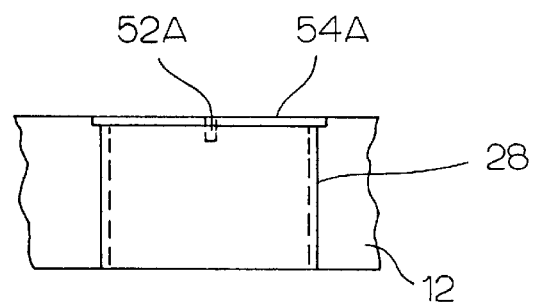
FIG. 11 is a broken away side view of the cover of FIG. 10 covering a vacuum port connection.

FIGS. 10 and 11 depict an alternative lid 46A, which may be used instead of the lid 46, for the storage/dust collection device 10 depicted in FIG. 1. This lid 46A has a round cover 54A attached to the lid 46A via a web 52A. The cover 54A may be drilled to any desired diameter as shown in the dotted lines to receive any size of vacuum line connector. The center point of the cover is marked to aid in drilling. It is anticipated that the web 52A will be broken to separate the round cover 54A from the lid 46A when the devices is being used.

Figure 6:
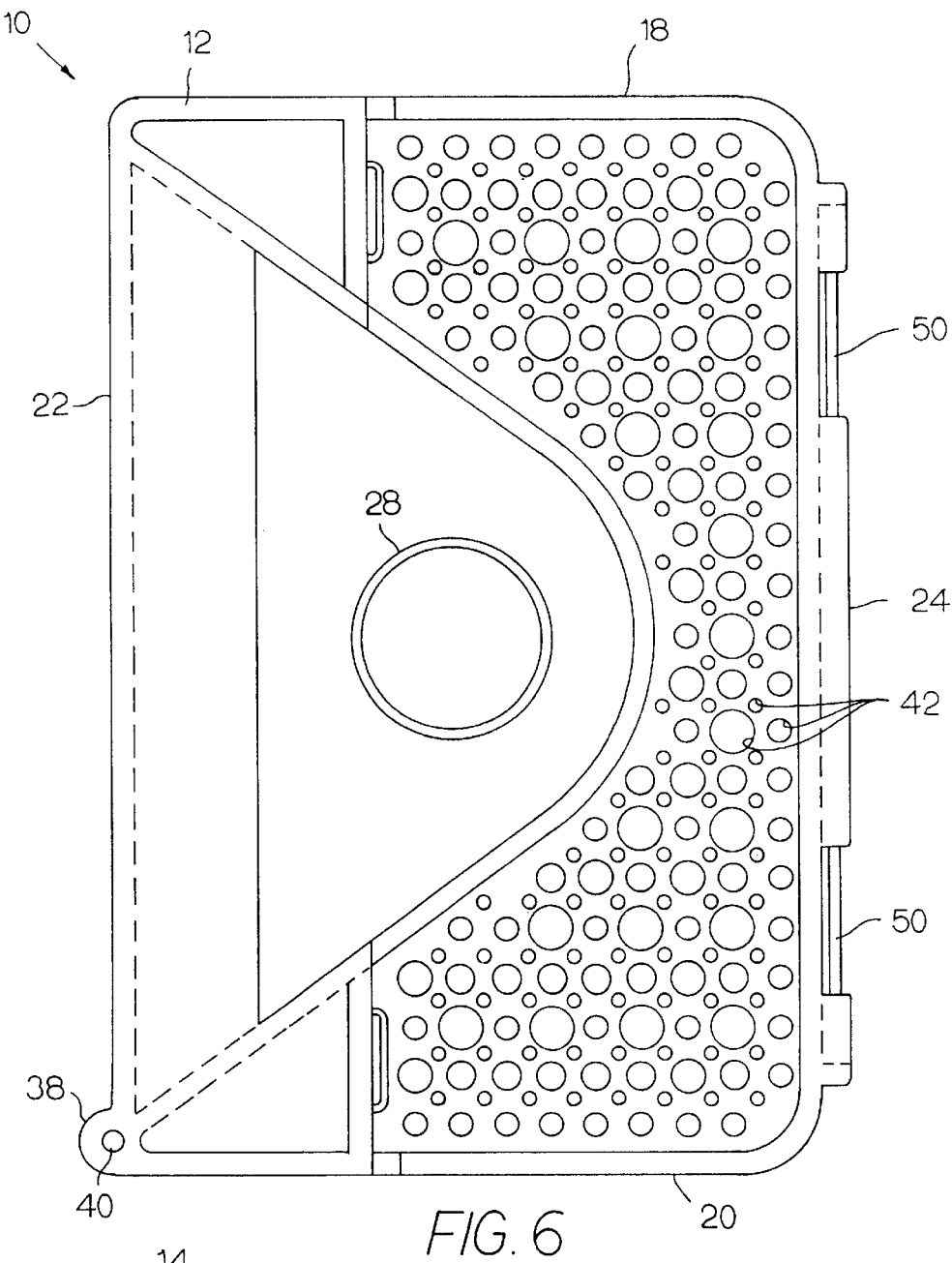
FIG. 6 is the same view as FIG. 2, but with the lid removed.
Figure 7:
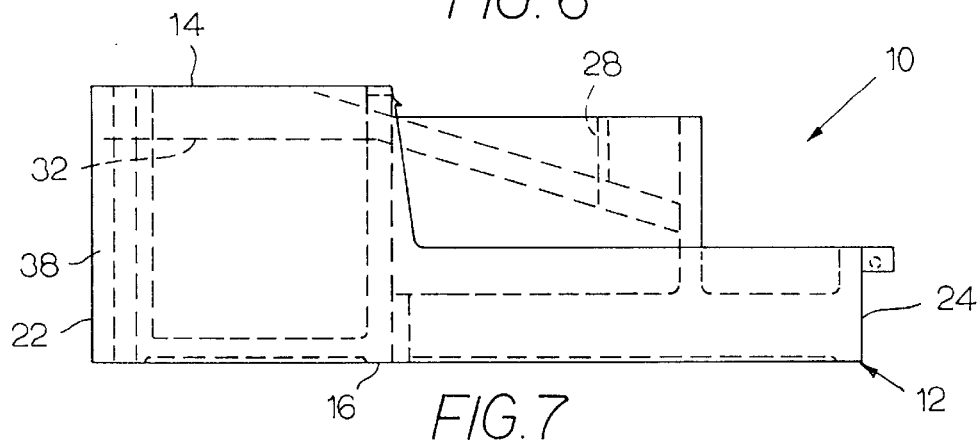
FIG. 7 is a side view of the storage/dust port device of FIG. 6.

FIGS. 6 and 7 show the storage/dust collection device 10, with the lid removed. While this provides a good view of the device, it also could be used in this manner, without the lid.

Figure 12:
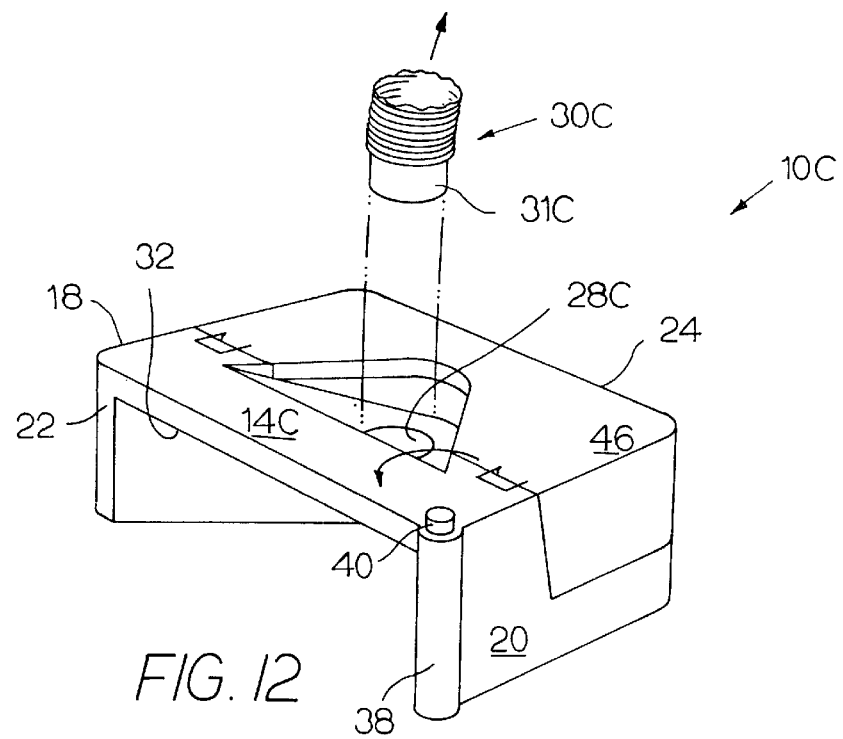
FIG. 12 is a perspective view of another embodiment of a storage/dust port device made in accordance with the present invention, showing a different type of vacuum port connection.

FIG. 12 illustrates another embodiment of a storage/dust port device 10C manufactured in accordance with the present invention. This embodiment 10C is very similar to the first embodiment 10 described earlier, except that it does not include a projection 28 to act as a vacuum port connection. Instead, it has a port formed as an opening 28C in the top surface 14C, which places the top surface 14C of the body in fluid communication with the internal cavity 32. In this case, the vacuum line 30C has a tubular projection 31C designed to be received snugly inside the port 28C. Other than the method for connection of the vacuum line 30 to the vacuum port connection 28, the operation of this storage/dust collection device 10C is identical to that of the first embodiment 10 already described.

Figure 13:
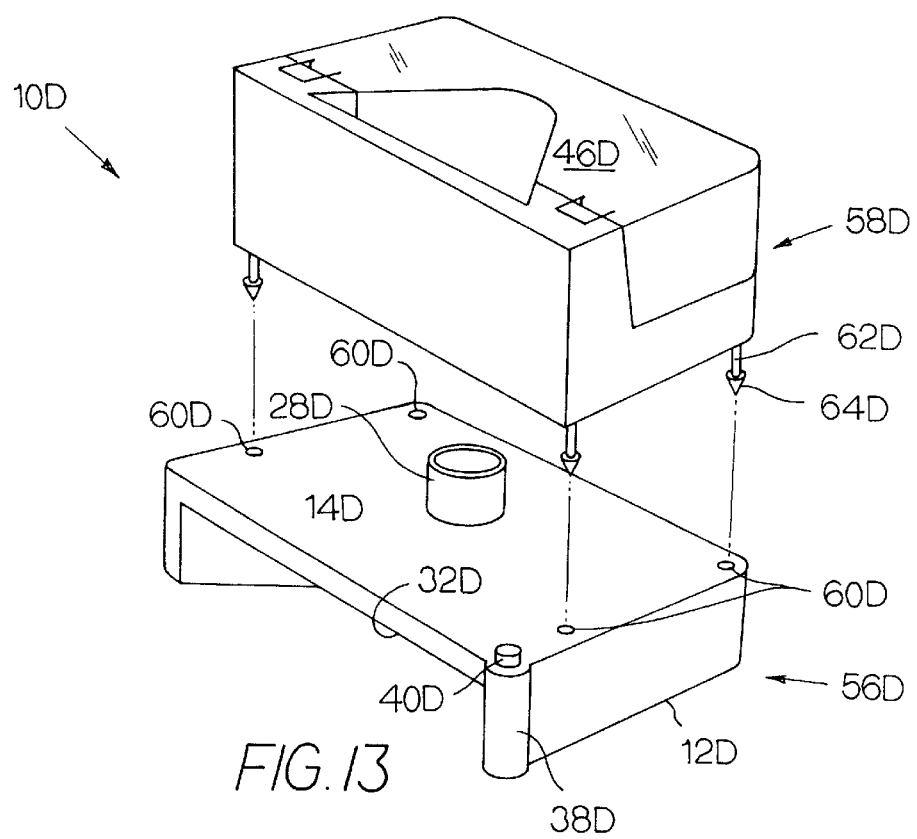
FIG. 13 is an exploded, perspective view of another embodiment of a storage/dust port device made in accordance with the present invention, wherein the storage compartment is a separate piece from, and snaps onto, the dust port portion.

FIG. 13 shows another embodiment of a storage/dust port device 10D manufactured in accordance with the present invention. Once again, this embodiment 10D is similar to the first embodiment 10 described earlier, except that in this fourth embodiment 10D, the dust particle and chips vacuum collection portion 56D is separate and independent from the tool bits storage portion 58D. The vacuum collection portion 56D includes the features associated with vacuum collection of dust particles and chips present in the first embodiment 10 such as the hollow body 12D, the cavity 32D which preferable becomes progressively smaller as it approaches the vacuum port 28D, and the rounded post 38D used as a fulcrum to guide and support the work piece 36 so as to minimize the kick back. The top surface 14D has four holes 60D used to align and hold the storage portion 58D onto the vacuum collection portion 56D, so that, even though the storage portion 58D is made of a separate piece, the tool storage recesses are still mounted on and supported by the main body 12D.

The tool bit storage portion 58D includes the features associated with storage of tool bits present in the first embodiment 10, such as the plurality of recesses 42D used for securely and separately holding the tool bits 44, and the lid 46D to close off the storage area. The storage portion 58D further includes four downwardly extending projections 62D, ending in barbs 64D. The projections 62D and the barbs 64D are designed to cooperate with the holes 60D on the vacuum collection portion 56D such that, when the projections 62D are aligned and inserted into their corresponding holes 60D, the storage portion 58D rests atop the vacuum collection portion 56D. The barbs 64D engage the holes 60D so as to keep the two portions 56D, 58D together, preventing their unintentional separation.

This embodiment of a storage/dust port device 10D functions in much the same manner as the first embodiment 10 previously described. However, it does have some interesting features. For instance, either part of the device, the vacuum collection portion 56D or the storage portion 58D, may be used independently of the other. Furthermore, a user may have more than one storage portion 58D, and the user may select which storage portion 58 to mount on the body 12D, depending on the machine tool being used at the time. For instance, the user may have a number of interchangeable storage portions 58D, with one containing router bits for use with a router, and another containing drill bits for using with a drill, for example. Of course, there are many other ways to connect together a storage portion and a dust collection portion. For example, the portions could be hooked together, hinged together, adhered together, slid together, and so forth.

Figure 14:
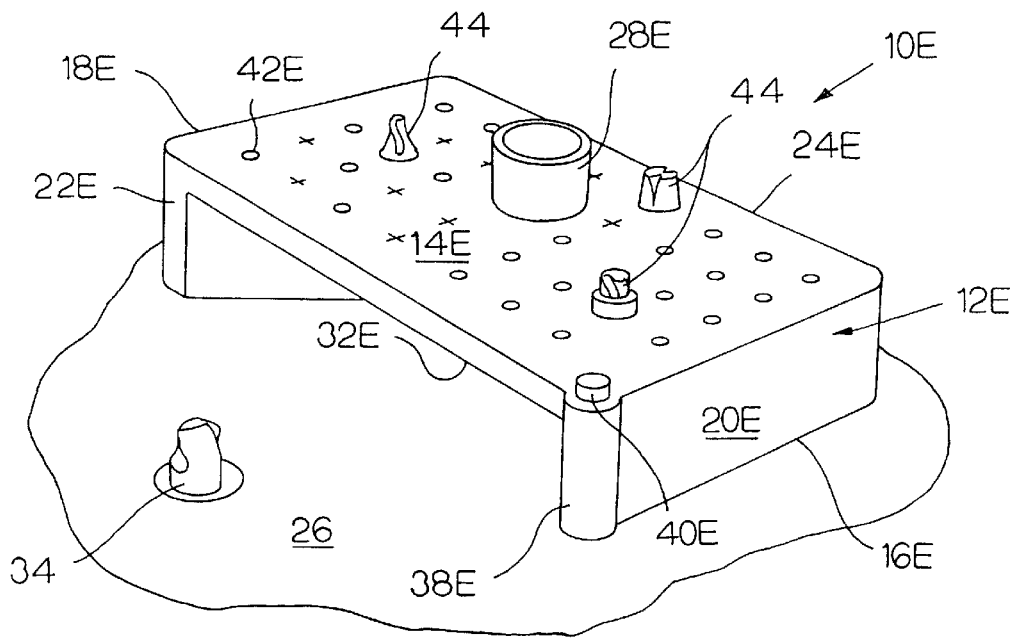
FIG. 14 is a perspective view of another embodiment of a storage/dust port device made in accordance with the present invention.

FIG. 14 depicts another embodiment of a storage/dust port device 10E manufactured in accordance with the present invention. In this embodiment 10E, the dust particle and chips vacuum port device 10E incorporates a plurality of holes 42E directly onto its top surface 14E to be used for storage of the tool bits 44. There is no provision for a lid to cover the tool bit storage area in this embodiment, but it is otherwise very similar in its function to the first embodiment 10. While the openings 42E in this and previous embodiments have been shown lying perpendicular to the base, they may lie in various orientations, such as at an angle from the vertical and even in the horizontal direction.

Figure 15:
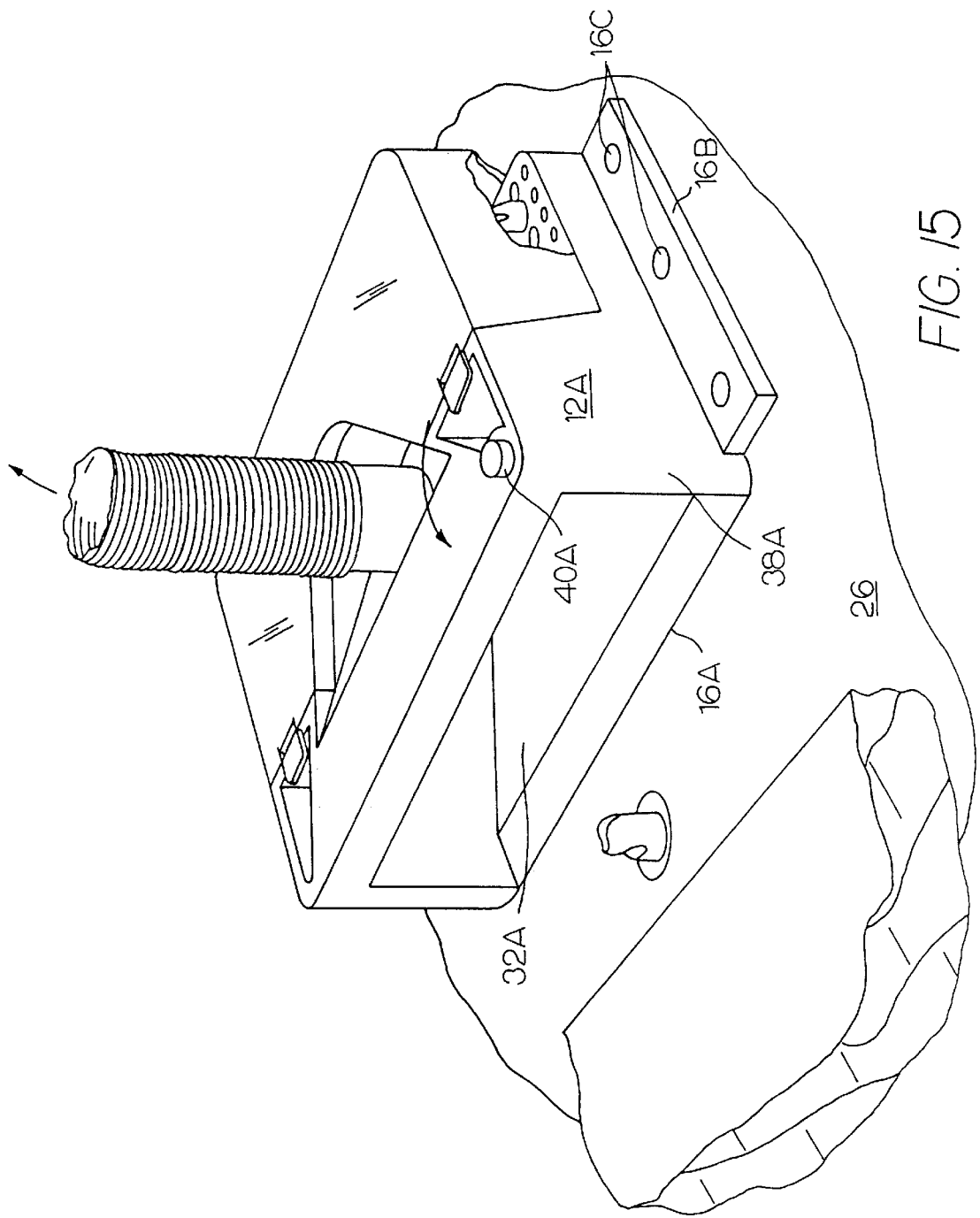
FIG. 15 is a perspective view of another embodiment of a storage/dust port device made in accordance with the present invention.

FIG. 15 shows another alternative embodiment, which differs from the embodiment of FIG. 1 in only a few ways. First, in this embodiment, the front post 38A does not project forward from the main portion of the body 12A. Instead, the corner of the body 12A is rounded, and the pin 40A is received within the body 12A to anchor the body 12A to the work table 26. Also, in this embodiment, the bottom surface 16A of the body 12A is not just an edge but rather forms the bottom of the cavity 32A. The front edge of the bottom surface 16A is tapered to make it easier for dust and chips to enter the cavity 32A. There is also a projection 16B on the bottom right portion of the body 12A, which defines holes 16C that may be used to secure the device to a work table 26.

The storage/dust port device of the present invention greatly eases and simplifies the task of storing the tool bits in a convenient location, providing protection and handy storage of the tool bits, protecting the user from accidental injury on the tool bits, and improving the quality of the environment around the work area by removing dust particles and chips as they are generated, and by keeping the work area clean and organized while work is in progress. The foregoing are only examples of some embodiments of storage/dust port devices made in accordance with the present invention. It will be obvious to those skilled in the art that modifications may be made to the embodiments described above without departing from the spirit and scope of the present invention.

What is claimed is:

1. A tool storage and dust port device, comprising:
    a body having front, rear, left, right, top, and bottom surfaces, and defining an opening in said front surface forming an interior cavity,
    a vacuum port on one of said surfaces in fluid communication with said interior cavity and adapted for connection to a vacuum line; and
    a plurality of recesses on said body for receiving tools.

2. A tool storage and dust port device as recited in claim 1, wherein said interior cavity is tapered from a large cross-sectional area at said opening to a smaller cross-sectional area adjacent to said vacuum port.

3. A tool storage and dust port device as recited in claim 2, wherein said interior cavity is defined by interior side walls, an interior rear wall, and an interior upper wall, and at least one of said interior walls is tapered.

4. A tool storage and dust port device as recited in claim 3, wherein said interior upper wall and said interior side walls are tapered.

5. A tool storage and dust port device as recited in claim 1, wherein at least some of said recesses are sized to receive the shanks of tool bits.

6. A tool storage and dust port device as recited in claim 5, wherein said recesses are various sizes to accommodate various-sized tool bits.

7. A tool storage and dust port device as recited in claim 5, wherein said recesses are substantially vertically oriented.

8. A tool storage and dust port device as recited in claim 1, and further comprising a lid covering at least a portion of said recesses.

9. A tool storage and dust port device as recited in claim 8, wherein said lid is made of a clear material.

10. A tool storage and dust port device as recited in claim 1, wherein said vacuum port is in said top surface and includes an upwardly-directed cylindrical projection.

11. A tool storage and dust port device as recited in claim 1, and further comprising a rounded front edge on said body for use as a support for a work piece to reduce kickback, and means for securing said body relative to a work table.

12. A tool storage and dust port device as recited in claim 1, wherein said recesses are on a separate tool storage portion, which is mounted on said body.

13. A tool storage and dust port device, comprising:
- a body having front, rear, left, right, top, and bottom surfaces, and defining an opening in said front surface forming an interior cavity;
- a vacuum port on one of said surfaces in fluid communication with said interior cavity and adapted for connection to a vacuum line; and
- a tool storage portion defining a plurality of recesses, wherein said body and said tool storage portion are separate pieces, and wherein said pieces are connected together to form the device.

14. A tool bit storage and dust port device as recited in claim 13, wherein said tool storage portion is mounted on top of said body.

15. A tool bit storage and dust port device as recited in claim 13, and further comprising a cover mounted on said tool storage portion.

16. A tool bit storage and dust port device as recited in claim 15, wherein said body and said tool storage portion are made from a polypropylene material, and said cover is made from a clear polycarbonate material.

17. A tool bit storage and dust port device, comprising:
- a hollow body defining an internal cavity and having a substantially flat bottom surface for resting on a work table;
- first and second openings into said cavity, said first opening being an opening for drawing chips and dust from a work piece into said cavity, and said second opening being a port for connecting a vacuum line to said cavity; and
- a tool storage portion on said body defining a plurality of recesses for receiving tool bits.

18. A tool bit storage and dust port device as recited in claim 17, wherein said tool storage portion is an integral part of said body.

19. A tool bit storage and dust port device as recited in claim 17, wherein said tool storage portion is a separate. piece from said body and is attached to said body.

20. A tool bit storage and dust port device as recited in claim 17, and further comprising a cover mounted on said tool storage portion.

21. A tool bit storage and dust port device as recited in claim 17, wherein said hollow body has a bottom edge adapted to rest on a flat work surface, and said internal cavity has an open bottom.

22. A tool bit storage and dust port device as recited in claim 17, wherein said hollow body has a bottom surface enclosing said internal cavity.

23. A tool storage and dust port device, comprising:
- a body having front, rear, left, right, top, and bottom surfaces, and defining an opening in said front surface forming an internal cavity;
- a vacuum port on one of said surfaces in fluid communication with said interior cavity and adapted for connection to a vacuum line; and
- means on said body for storing tools.

* * * * *